Feb. 17, 1925.
W. E. PARKER
1,526,367
LOCKING JOINT
Filed Aug. 16, 1923
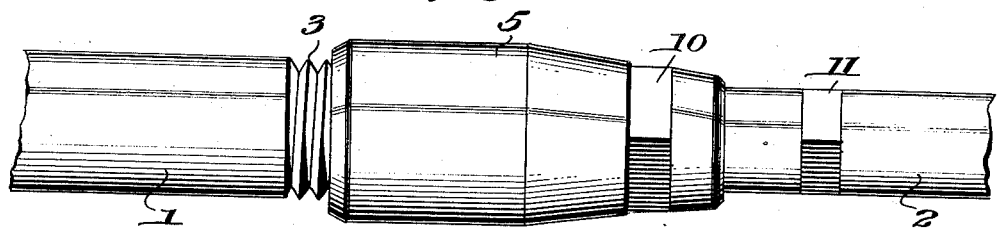
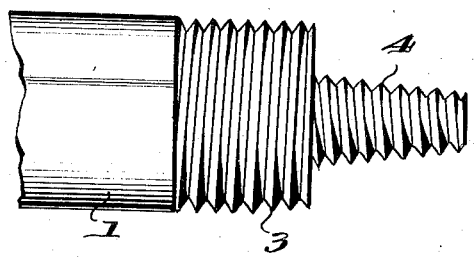
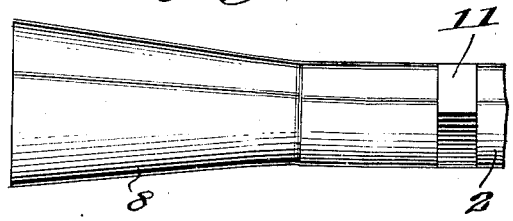
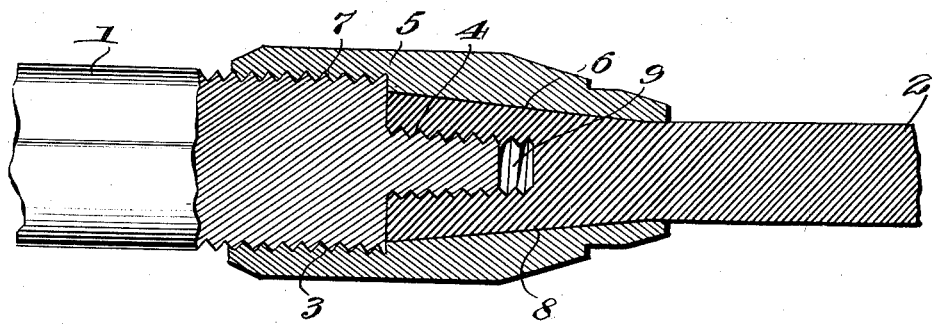
Inventor,
Willis Earl Parker
By
Atty.

Patented Feb. 17, 1925.

1,526,367

UNITED STATES PATENT OFFICE.

WILLIS EARL PARKER, OF SEBREE, KENTUCKY.

LOCKING JOINT.

Application filed August 16, 1923. Serial No. 657,704.

*To all whom it may concern:*

Be it known that I, WILLIS EARL PARKER, a citizen of the United States, residing at Sebree, in the county of Webster and State of Kentucky, have invented certain new and useful Improvements in Locking Joints, of which the following is a specification.

This invention relates to locking joints for connecting the parts of earth boring tools and is particularly intended for connecting the drill bit to the stem.

In ordinary practice the drill bit is simply screwed onto the stem. The constant pounding tends to crystallize the connecting pin and this causes breakage whereupon the drill bit falls and a tedious and expensive fishing operation has to be resorted to to remove the bit from the well.

It has been proposed in certain patented constructions to prevent disconnection of the drill bit by unscrewing due to impact but, so far as I am aware, satisfactory provision has not been made to so protect a sufficient length of the bit and stem as to prevent crystallization of the metal with consequent breakage nor to prevent the bit from dropping off in the event of breaking.

The object of my invention is to provide an improved locking joint, particularly adapted to connect a drill bit to its stem which will overcome the defects previously set forth and will accomplish purposes now to be recited.

My invention minimizes crystallization and breakage, due to the employment of a sleeve which is screwed onto the bit and has a tapered interior receiving a tapered end of the stem. The sleeve reinforces the ordinary screw joint between the bit and stem and because of the length of the sleeve and the provision of the tapered parts, gripping or locking action results which provides a firm and rigid connection. The pounding action which occurs between the end of the drill bit and the stem is largely absorbed by the sleeve and the tendency to crystallization, and breaking, due to the repeated blows, is minimized. Thus, the defect heretofore incident to joints of this general character is overcome as such collars or connecting means as have heretofore been proposed do not prevent crystallization and breaking off at the top, or at the bottom, of the collar.

Furthermore, by the provision of the expanded or tapered end of the stem and the corresponding taper of the sleeve, any spreading action at the joint between the bit and stem due to the blows of the bit, only tends to more tightly grip the parts together and as the sleeve constitutes an outer reinforcement for the joint, crystallization and breakage are minimized.

If, however, breakage should occur, the expanded end of the stem and the interiorly tapered construction of the sleeve prevents the parts from separating and thus if the joints should break, the collar prevents the bit from dropping off from the stem.

Other advantages of the invention will appear from the construction hereinafter described.

In the accompanying drawings:

Figure 1 is a side elevation of the complete joint;

Fig. 2 is a detail view of the screw threaded end of the bit-stem;

Fig. 3 is a detail view of the end of the operating stem; and

Fig. 4 is a longitudinal section through the joint.

The stem of the drill bit is shown at 1 and a part of the operating stem (which will be as long as necessary) is shown at 2.

The bit stem 1 is provided with a screw thread 3 and it also has at its end a coupling screw threaded lug or pin 4. It is immaterial which of the threads 3 or 4 is a right hand thread but if the screw thread 3 is a right hand thread then the screw thread 4 should be a left hand thread and vice versa.

My improved gripping or locking and reinforcing sleeve is shown at 5. The exterior of this thread may be tapered but the improved feature is that the interior or bore of the sleeve be tapered as shown at 6 from a point in the region of the termination of the internal screw threads 7 of the sleeve which engage with the screw threaded part 3.

The stem 2 has an expanded, tapered, part 8 which conforms to the tapered bore 6 and is provided with a screw threaded socket 9 for engaging the tapered screw threaded pin or lug 4.

It will be seen that in addition to the joint provided by the tapered screw threaded pin 4 and the screw threaded socket 9 which have hertofore been used for connecting a drill bit to the operating stem or rod, I have provided the sleeve 5 which screws onto the drill bit stem 1 and has a tapered interior or bore 6 which cooperates with the reversely tapered part 8 on the stem 2 to accomplish the objects of the invention.

The sleeve 5 is of such length that it reinforces the joints 4, 9, and minimizes tendency to crystallize on the part of the bit 1 and stem 2. Furthermore, the reactionary effect of the pounding or blows of the bit tends to expand the end 8 to cause it to more securely fit the bore 6 and as the fit is a tight one, extra thickness of metal afforded by the sleeve 5 absorbs the shock and affords great strength.

However, should crystallization of the metal result in breakage of the pin 4, the bit will not drop off because the tapered connection between the sleeve 5 and the stem 2 will hold the bit to the stem until a new bit can be substituted.

Polygonal parts 10 and 11 may be provided on the sleeve 5 and stem 2, respectively, to afford places for the application of a wrench so that the parts may be screwed tightly together.

The present invention is not limited to use as a connection for earth boring tools but may be employed as a rope or cable joint or connection or for connecting rods or parts, however they may be used. In the claim the word "stem" or "stems" is not to be considered as limiting the use to which the joint may be put nor to define the connected parts as being rigid.

I claim:

In a joint of the class described, the combination with a stem having external screw threads and an externally screw threaded lug or pin of reduced size projecting from its end, of another stem provided with an elongated, tapered end which is largest at its extremity and regularly and gradually tapers or decreases in size inwardly from said extremity, said tapered end having an internal screw threaded socket of considerably shorter length than itself receiving the screw threaded lug or pin aforesaid and of a length permitting the ends of the stems to abut each other, the end of the lug being spaced from the bottom of said socket, and a sleeve having internal screw threads at one end screwed onto the external screw threads of the first named stem and provided with an elongated, gradually and regularly tapered bore fitting the tapered end of the last named stem, the tapered part of said sleeve enclosing the tapered end of said last named stem for a distance well beyond the ends of the socket and pin.

In testimony whereof I affix my signature.

WILLIS EARL PARKER.